United States Patent Office 3,549,713 Patented Dec. 22, 1970

3,549,713

OXIDATION OF ORGANIC COMPOUNDS

Hugh Bernard Charman, Norton-on-Tees, England, assignor to Imperial Chemical Industries Limited, London, England, a corporation of Great Britain No Drawing. Filed Oct. 31, 1966, Ser. No. 590,484
Claims priority, application Great Britain, Nov. 8, 1965, 47,260/65
Int. Cl. B01j *11/82;* C07c *39/04, 39/14*
U.S. Cl. 260—621 14 Claims

ABSTRACT OF THE DISCLOSURE

A process for producing phenol wherein an aromatic hydrocarbon or a phenol is contacted in the liquid phase with hydrogen and oxygen in the presence of a reaction medium comprising a redox system and a compound of a noble metal of Group VIII of the Periodic Table.

This invention relates to the oxidation of aromatic hydrocarbons and phenols.

According to the invention there is provided a process for the production of a phenol in which an aromatic hydrocarbon or a phenol is brought into contact in the liquid phase with hydrogen and oxygen in the presence of a reaction medium comprising a redox system and a compound of a noble metal of Group VIII of the Periodic Table.

The aromatic hydrocarbon may be for example, benzene, an alkylbenzene such as toluene, biphenyl or naphthalene. The process of the invention is particularly applicable to the oxidation of benzene to phenol.

The phenol to be oxidised may be for example, phenol (hydroxybenzene). A product of the oxidation of phenol is hydroquinone.

Suitable redox systems are provided by a metal salt soluble in the reaction medium, such as a halide, particularly a chloride, or a carboxylate, particularly an acetate. Examples of suitable salts are iron or nickel salts. It is preferred that the redox system is provided by an iron salt, preferably a carboxylate and more preferably an acetate.

The compound of a noble metal of Group VIII of the Periodic Table should be at least partly soluble in the reaction medium. The compound of a Group VIII metal may very suitably be a halide such as palladous chloride, ruthenium chloride or rhodium chloride, or a complex compound of the type $IrL_nX_3$ or $RhL_3X$ where $n$ is 2 or 3, L is a tertiary phosphine of arsine and X is an anion such as hydrogen or chlorine. The compound of a Group VIII metal may also be a compound of platinum of the type $PT(PR_3)_4$ where R is an alkyl or aryl group, very suitably phenyl. It is preferred that a compound of tin e.g. a halide, is present together with a compound e.g. ha halide, or platinum in the reaction medium; the platinum and tin compounds may be in the form of a complex compound for example, a complex chloride of platinum and tin.

It is a feature of the invention to provide a catalyst system suitable for the oxidation of aromatic hydrocarbons to phenols which comprises a redox system, a platinum compound and a tin compound. As already indicated the platinum and tin compounds may be provided by a complex compound of platinum and tin and the compounds may very suitably be the halides e.g. chlorides. Further the redox system may very suitably be provided by an iron salt, preferably a carboxylate, for example, an acetate.

An alkali metal halide such as lithium chloride is preferably also present in the reaction medium. The alkali metal halide promotes the rate of gas absorption. It is further preferred that the molar ratio of the metal salt e.g. ferric acetate, providing the redox system, to alkali metal halide e.g. lithium chloride, is within the range 3:2 to 1:2, very suitably about 3:4.

The reaction medium prferably comprises a solvent for the reactants such as a carboxylic acid, preferably acetic acid. The carboxylic acid may contain up to for example, 10% of water, but preferably the carboxylic acid is substantially anhydrous e.g. glacial acetic acid.

The hydrogen and/or oxygen may be diluted with a gas such as nitrogen which is inert under the conditions of the process. The volume ratio of hydrogen to oxygen may vary over a wide range, the particular ratio employed depending upon the products required. A ratio of hydrogen to oxygen within the range 1:100 to 1:2, particularly 1:100 to 1:10, is very suitable. However, we have found that increasing the proportion of hydrogen tends to inhibit the formation of dihydric phenols and therefore in the oxidation of an aromatic hydrocarbon to monohydric phenol it is preferred that the hydrogen: oxygen ratio is greater than 1:2; ratios up to 100:1, for example, 19:1, are suitable. These high hydrogen: oxygen ratios are of a particular advantage in the oxidation of benzene to phenol.

Especially when a low hydrogen: oxygen ratio i.e. a ratio not exceeding 1:2, is used it is desirable that free acid be present in the liquid phase. A variety of strong acids may be used, for example, hydrochloric acid, formic acid or perchloric acid. The acid serves to maintain the activity of the catalyst and to inhibit the oxidation of phenol to hydroquinone.

The reaction may be carried out at any convenient temperature below the temperature at which degradation of a reactant or product occurs. However, temperatures within the range 10° to 1000° C. are preferred. The pressure should be at least sufficient to maintain the liquid phase.

EXAMPLE 1

A solution was prepared as follows:

0.208 g. platinous chloride, 1,208 g. stannous chloride dihydrate and 0.407 g. lithium chloride were mixed with 44.4 ml. of a 0.229 molar solution of ferric acetate in glacial acetic acid. 0.3 g. phenol and 40 ml. benzene were then added to the mixture and the total volume of acetic acid made up to 200 ml.

A mixture of 28.5 litres per hour of hydrogen and 1.5 litres per hour of oxygen was then passed through the solution maintained at a temperature of 50° C. for 3 hours. The rate of gas absorption varied between 11 and 17 cc. per minute.

0.01 g. phenol and 0.13 g. hydroquinone were obtained. representing yields of 4.5% and 0.75% respectively by weight of the hydrogen consumed. No other products were detected.

EXAMPLE 2

A solution was prepared as described in Example 1 except that it contained no phenol.

A mixture of 6 litres per hour of hydrogen, 1.5 litres per hour of oxygen and 22.5 litres per hour of nitrogen was then passed through the solution maintained at a temperature of 50° C. for 3 hours.

0.20 g. phenol and 0.07 g. hydroquinone were obtained representing yields of 2.9% and 0.87% respectively by weight of the hydrogen consumed. No other products were detected.

EXAMPLE 3

A solution was prepared as follows:

0.218 g. platinous chloride, 1.204 g. stannous chloride dihydrate, and 0.408 g. lithium chloride were mixed with 51.3 ml. of a 0.217 molar solution of ferric acetate in glacial acetic acid. 20 ml. benzene were then added to the mixture and the total volume of acetic acid made up to 200 ml.

A mixture of 30 litres per hour of oxygen and 2 litres per hour of hydrogen was then passed through the solution maintained at a temperature of 50° C. for 2 hours. After 44 minutes reaction time 0.5 ml. concentrated hydrochloric acid was added to the solution followed after 80 minutes, by a further 1 ml. concentrated hydrochloric acid. After 56 minutes 5 ml. of water were added to the solution and after 63 minutes 10 ml. of a 0.217 molar solution of ferric acetate in glacial acetic acid.

The rate of absorption of gas was initially 16 cc. per minute and finally 2 cc. per minute.

0.01 g. phenol and 0.13 g. hydroquinone were obtained.

EXAMPLE 4

A solution was prepared as follows:

0.109 g. platinous chloride, 0.602 g. stannous chloride dihydrate, and 0.204 g. lithium chloride were mixed with 51.3 ml. of a 0.217 molar solution of ferric acetate in acetic acid. 40 ml. benzene and 1.5 ml. hydrochloric acid were then added to the mixture and the total volume of acetic acid made up to 200 ml.

A mixture of 30 litres per hour of oxygen and 2 litres per hour of hydrogen was then passed through the solution maintained at 50° C. for 1 hour. The rate of absorption of gas was initially 36 cc. per minute and finally 6 cc. per minute.

0.054 g. phenol and 0.019 g. hydroquinone were obtained representing yields of 1.65% and 0.6% respectively by weight of the hydrogen consumed.

EXAMPLE 5

The following experiment demonstrates the suitability of a nickel redox system as a component of the reaction medium of the invention.

0.216 g. platinous chloride, 1.23 g. stannous chloride dihydrate, 0.54 g. lithium chloride and 2.74 g. nickel acetate tetrahydrate were dissolved in 200 mls. of acetic acid.

A mixture of 30 litres per hour of oxygen and 2 litres per hour of hydrogen was passed through the solution maintained at 50° C. for 4½ hours. Gas was absorbed at a rate varying from 2 to 5 cc. per minute.

EXAMPLE 6

The following experiment demonstrates the suitability of a platinum compound of the type $Pt(PR_3)_4$ as a component of the reaction medium of the invention.

0.517 g. platinum tetra-triphenylphosphine $$(Pt(PPh_3)_4)$$

0.34 g. lithium chloride and 72.3 mls. of a 0.248 molar solution of ferric acetate in glacial acetic acid were mixed together and the total volume of glacial acetic acid made up to 240 ml.

A mixture of 2 litres per hour of hydrogen and 30 litres per hour of oxygen was passed through the solution obtained as described above and maintained at 50° C. for 2 hours. Gas was absorbed at a rate varying from 2 to 3.5 cc. per minute.

EXAMPLE 7

The following experiments illustrate the variation in the rate of absorption of hydrogen and oxygen with variation in the hydrogen:oygen ratio.

0.218 g. platinous chloride, 1.204 g. stannous chloride, 0.408 g. lithium chloride and 44 mls. of a 0.218 molar solution of ferric acetate in acetic acid were mixed together and the total volume of acetic acid made up to 200 ml. 30 litres per hour of a mixture of hydrogen, oxygen and, except in the last experiment, nitrogen was passed through the solution thus formed and maintained at 50° C. and the average rate of gas absorption determined over a period of 2 hours. The following table gives the results obtained.

| $H_2$ Percent volume | $O_2$ percent volume | $N_2$ percent volume | Ratio $H^2:O^2$ | Gas absorption rate (cc./l./min.)* |
|---|---|---|---|---|
| 1 | 5 | 94 | 1:5 | 4.6 |
| 5 | 5 | 90 | 1:1 | 31.0 |
| 10 | 5 | 85 | 2:1 | 49.0 |
| 20 | 5 | 75 | 4:1 | 51.0 |
| 40 | 5 | 55 | 8:1 | 59.0 |
| 50 | 5 | 45 | 10:1 | 60.0 |
| 60 | 5 | 35 | 12:1 | 61.0 |
| 80 | 5 | 15 | 16:1 | 59 |
| 90 | 5 | 5 | 18:1 | 57 |
| 95 | 5 | 0 | 19:1 | 37 |

*NOTE.—The rate of gas absorption is expressed as cc. gas per litre of solution per minute.

EXAMPLE 8

The effect of varying the ferric acetate:lithium chloride ratio on the absorption rate of hydrogen and oxygen is shown in the following table. 0.109 g. platinous chloride, 0.32 g. stannous chloride dihydrate, 0.035 mole ferric acetate and varying amounts of lithium chloride were dissolved in 100 ml. glacial acetic acid and oxygen containing 4% by volume of hydrogen passed through the solution maintained at 50° C. at a rate of 30 litres per hour.

| LiCl (moles) | Molar ratio, ferric acetate: lithium chloride | Gas absorbed (ml./l./min.)* |
|---|---|---|
| 0.006 | 6:1 | 40 |
| 0.012 | 3:1 | 46 |
| 0.024 | 3:2 | 65 |
| 0.048 | 3:4 | 94 |
| 0.072 | 1:2 | 71 |

*NOTE.—The rate of gas absorption is expressed as ml. gas per litre of solution per minute.

I claim:

1. A process for the production of a phenol in which a member selected from the group consisting of benzene, toluene, biphenyl and naphthalene is brought into contact in the liquid phase with hydrogen and oxygen in the presence of a reaction medium comprising acetic acid containing at most 10% water, a redox system comprising a metal salt selected from the group consisting of iron and nickel salts, said salts being soluble in said reaction medium and a platinum chloride compound at least partly soluble in said reaction medium at a temperature of 10–100° C. and at a pressure sufficient to maintain the liquid phase.

2. The process of claim 1 wherein there is included in said reaction medium a tin chloride compound which is at least partly soluble in said reaction medium.

3. A process as claimed in claim 1 in which the iron salt is a carboxylate.

4. A process as claimed in claim 3 in which the carboxylate is an acetate.

5. A process as claimed in claim 1 in which an alkali metal halide is present in the reaction medium.

6. A process as claimed in claim 5 in which the alkali metal halide is lithium chloride.

7. A process as claimed in claim 6 in which the molar ratio of the metal salt providing the redox system to lithium chloride is within the range 3:2 to 1:2.

8. A process as claimed in claim 7 in which the molar ratio is about 3:4.

9. A process as claimed in claim 1 in which the ratio of hydrogen to oxygen by volume is within the range 1:100 to 1:2.

10. A process as claimed in claim 1 in which the ratio of hydrogen to oxygen by volume exceeds 1:2.

11. A catalyst system suitable for the oxidation of aromatic hydrocarbons selected from the group consisting of benzene, toluene, biphenyl, naphthalene and phenol to phenols which consists essentially of acetic acid solvent containing at most 10% water, a redox system comprising a metal salt selected from the group consisting of iron and nickel salts, said salt being soluble in said solvent, a platinum chloride compound at least partly soluble in said solvent and a tin chloride compound at least partly soluble in said solvent.

12. A catalyst system as claimed in claim 11 in which the redox system is provided by an iron salt.

13. A catalyst system as claimed in claim 12 in which the iron salt is a carboxylate.

14. A catalyst system as claimed in claim 13 in which the carboxylate is an acetate.

References Cited

UNITED STATES PATENTS

| | | | |
|---|---|---|---|
| 3,408,409 | 10/1968 | Coffey et al. | 260—621 |
| 3,377,386 | 4/1968 | Chafetz | 260—621X |
| 3,122,586 | 2/1964 | Berndt et al. | 252—441 |

FOREIGN PATENTS

| | | | |
|---|---|---|---|
| 1,366,253 | 6/1964 | France | 23—207 |

BERNARD HELFIN, Primary Examiner

N. P. MORGENSTERN, Assistant Examiner

U.S. Cl. X.R.

252—429, 431; 260—620